US005254408A

United States Patent [19]

Takeuchi et al.

[11] Patent Number: 5,254,408

[45] Date of Patent: Oct. 19, 1993

[54] MAGNET WIRE AND ELECTROMAGNETIC RELAY USING THE SAME

[75] Inventors: Akihisa Takeuchi; Waichiro Kozen; Hirohiko Nakabayashi, all of Aichi, Japan

[73] Assignee: Sumito Electric Industrial Co., Ltd., Osaka, Japan

[21] Appl. No.: 117,607

[22] Filed: Nov. 6, 1987

[30] Foreign Application Priority Data

Nov. 11, 1986 [JP] Japan ............................... 61-268904
Nov. 11, 1986 [JP] Japan ............................... 61-268905
Nov. 11, 1986 [JP] Japan ............................... 61-268906

[51] Int. Cl.⁵ ........................ B32B 27/00; D02G 3/00

[52] U.S. Cl. .................................... 428/383; 428/379; 428/380; 174/120 SR; 174/120 R; 174/120 C; 174/110 SR

[58] Field of Search ....................... 428/380, 379, 383; 174/120 SR, 120 R, 120 C, 110 SR

[56] References Cited

U.S. PATENT DOCUMENTS 3,413,148 11/1968 Sattler et al. ........................ 428/457
3,775,175 11/1973 Merian ................................ 428/379
4,605,917 8/1986 Ide et al. ............................. 428/383
4,716,079 12/1987 Sano et al. .......................... 427/383

FOREIGN PATENT DOCUMENTS 0103307 3/1984 European Pat. Off. .
1248200 9/1971 United Kingdom .

*Primary Examiner*—Patrick J. Ryan
*Assistant Examiner*—J. M. Coray
*Attorney, Agent, or Firm*—Sughrue, Mion, Zinn, Macpeak & Seas

[57] ABSTRACT

A polyurethane magnet wire comprising a conductor having provided thereon a polyurethane insulation coating, wherein the total amount of the phenolic compounds contained in organic compounds which evaporate from said coating by heating at 280° C. for 2 minutes is 0.2 wt % or less based on the weight of the coating and the total amount of the organic compounds is 2 wt % or less based on the weight of the coating; and an electric relay comprising such a wire.

19 Claims, 1 Drawing Sheet

MAGNET WIRE AND ELECTROMAGNETIC RELAY USING THE SAME

BACKGROUND OF THE INVENTION

The present invention relates to a magnet wire used in excitation coils in electrical equipment such as an electromagnetic relay, as well as to an electromagnetic relay using this magnet wire. In particular, the present invention relates to a magnet wire for use in a sealed type electromagnetic relay which has both relay contacts and drive coils confined and sealed in a common space. The present invention also relates to a sealed type electromagnetic relay using such a magnet wire.

Magnet wires of the type contemplated by the present invention are conventionally produced by the following procedures: a enamel of an electrically insulating material dissolved in an organic solvent is applied to the circumference of a conductor such as a copper wire and subsequently cured with heat to form an insulation coating, which is then coated with a layer of a lubricant such as paraffin or oil so as to provide good slipping property of the magnet wire and to prevent it from breaking during winding. Polyurethane based compounds are commonly used as the electrically insulating materials of the enamel. A cross section of the so prepared magnet wire is shown in FIG. 1, in which 1 is a conductor 2 is an insulation coating, and 3 is a layer of lubricant.

A sealed type electromagnetic relay using excitation coils which are formed of the magnet wire of the type described above is shown schematically in FIG. 2, in which the excitation coils are indicated by 4. As the relay is repeatedly operated, the lubricant component in the coils evaporate to generate a gas which fills the space in a closed vessel 5 and is deposited or carbonized by arc on the surface of contact elements 6 as it is cyclically brought into an open and a closed position. This deposition or carbonization of the evaporated lubricant component inevitably increases the contact resistance of the contact elements. In addition, the remaining solvent in the insulation coating of the coils 4, the unreacted phenolic compound used as a masking agent for the masked polyisocyanate which is one of the starting materials for the production of the polyurethane resin, and a low molecular weight organic compound such as the thermal decomposition product of the insulation coating which forms as a result of baking with heat, evaporate to generate a gas which fills the space in the vessel 5 and is carbonized on the surface of the contact elements 6 as it is cyclically brought into an open and a closed position, thereby increasing the contact resistance of the contact elements. In either case, the reliability of the sealed type electromagnetic relay is reduced.

SUMMARY OF THE INVENTION

It is therefore an object of the present invention to provide a magnetic wire which is free from the aforementioned problems encountered in the conventional electromagnetic relay employing excitation coils.

Other and further objects of the present invention will appear more fully from the following description.

As a result of various studies conducted in order to solve the aforementioned problems, the present inventors found that the above and other objects of the present invention can be attained by a polyurethane magnet wire comprising a conductor having provided thereon a polyurethane insulation coating, wherein the total amount of the phenolic compounds contained in organic compounds which evaporate from the coating by heating at 280° C. for 2 minutes is 0.2 wt % or less based on the weight of the coating, and the total amount of the organic compounds is 2 wt % or less based on the weight of the coating; and an electromagnetic relay comprising such a wire. The present invention has been accomplished on the basis of this finding.

The present inventors also found that the objects can be attained more effectively by a polyurethane magnet wire comprising a conductor having provided thereon a polyurethane insulation coating, wherein the total amount of the phenolic compounds contained in organic compounds which evaporate from the coating by heating at 280° C. for 2 minutes is 0.2 wt % or less based on the weight of the coating, and the total amount of the organic compounds is 2 wt % or less based on the weight of the coating and having provided on the polyurethane insulation coating a coating of an organic lubricant having a vapor pressure of $1\times10^{-1}$ Torr or less at 200° C.; and an electromagnetic relay comprising such a polyurethane magnet wire. The present invention has been accomplished on the basis of this additional finding.

DETAILED DESCRIPTION OF THE INVENTION

Figure 1:
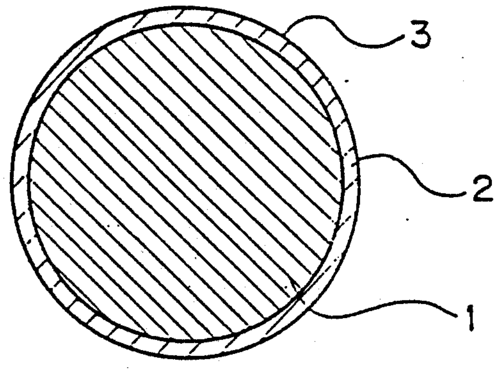
FIG. 1 is a cross section of a magnet wire.
Figure 2:
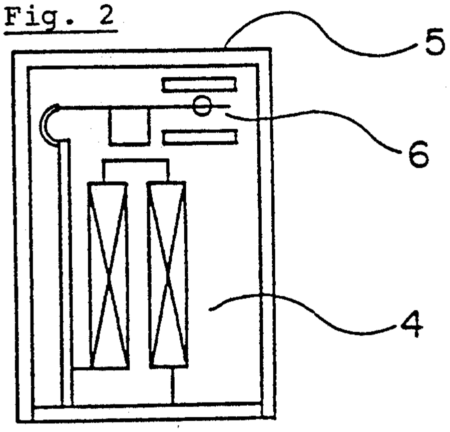
FIG. 2 is a schematic diagram of an electro-magnetic relay which is one example of the applications of the magnet wire.

The polyurethane enamel used in the present invention to make the polyurethane insulation coating is prepared by dissolving in a solvent a compound having active hydrogen in the molecule and a polyisocyanate compound or a masked polyisocyanate compound. The polyurethane enamel may also contain an additive such as a lubricant, a pigment, a dye, a curing agent, a filler, etc.

The organic lubricant which can be used in the present invention and which has a vapor pressure of $1\times10^{-1}$ Torr or less at 200° C. is preferably selected from among polyolefinic hydrocarbon compounds because of their good lubricating property, and polyethylene, polypropylene, and polymethylpentene are particularly preferred. These polymers may be straight-chain or branched in their backbone structure. From the viewpoint of lubricating efficiency, a straight-chain polyethylene is most preferred.

Another preferred coating of organic lubricant may be formed by applying and baking an enamel which comprises (a) polyethylene, (b) a binder for preventing separation of a polyethylene coat, and (c) a solvent. The weight ratio of (a) polyethylene to (b) binder is preferably in the range of from 1/99 to 90/10. If the weight ratio of (a) to (b) is less than 1/99, the lubricating property is relatively not excellent and if the weight ratio of (a) to (b) is more than 90/10, the polyethylene coating tends to separate. The weight ratio of (a) to (b) is more preferably in the range of from 10/90 to 50/50 in view of a high lubricating effect without causing separation of the lubricant coating.

The average molecular weight of the polyethylene (a) is preferably 5,000 or less, and is preferably 500 or more. If a polyethylene having an average molecular weight of more than 5,000 is used, a smooth lubricant coat will not be formed on the surface of a magnet wire and the commercial value will relatively be impaired. A polyethylene having an average molecular weight of less than 500 tends to evaporate upon heating and is not preferred for forming a satisfactory film of lubricant. However, even if the average molecular weight of the polyethylene is more than 5,000 or less than 500, the above disadvantage is arisen, but the effects of the present invention are maintained.

Any resin can be used as the binder (b) for preventing the separation of polyethylene coating so long as it is capable of preventing separation of a polyethylene coating after it has been applied to the magnet wire and subsequently baked with heat. A preferred binder resin include a thermoplastic resin or a thermosetting resin which, when baked, undergoes crosslinking of the molecules to form a macromolecule. Also usable is a resin which is conventionally incorporated in an insulating enamel for making a magnet wire.

The amounts of the organic compounds which are evaporated from the insulation coating of the magnet wire can be determined by the following procedure.

First, the coating is heated to 280° C. for 2 minutes and the evaporating gases are analyzed with an appropriate apparatus such as a gas chromatograph or a mass spectrometer, followed by determining the quantities of each of the organic compounds with a suitable instrument such as an integrator attached to the analyzer.

More specifically, the present inventors employed the following method. A sample of approximately 20 mg of the magnet wire was accurately weighed and a gas chromatograph (Model 163 of Hitachi, Ltd.) was directly coupled to a heat decomposition furnace (Model KP-1 of Hitachi, Ltd.) in which the sample was set and heated at 280° C.

The organic compounds which evaporated from the insulation coating of the sample were introduced together with a carrier gas (high-purity $N_2$ gas), into a separation column of 1 m length which was installed on the gas chromatography.

The sample was recovered from the heat decomposition furnace two minutes after it was charged into the furnace. The organic compounds separated by the column were detected with an $H_2$ flame ionizing detector and the detected signals were counted with an integrator (Model 5000E of System Instruments, Inc.).

Then the resulting counts were compared with those preliminarily obtained from a standard solution of each of the organic compounds to determine the quantities of the evaporated organic compounds.

Finally, the weight percentages of the evaporated organic compounds were calculated from the weight of the insulation coating as determined from the weight of the sample.

Figure 3:
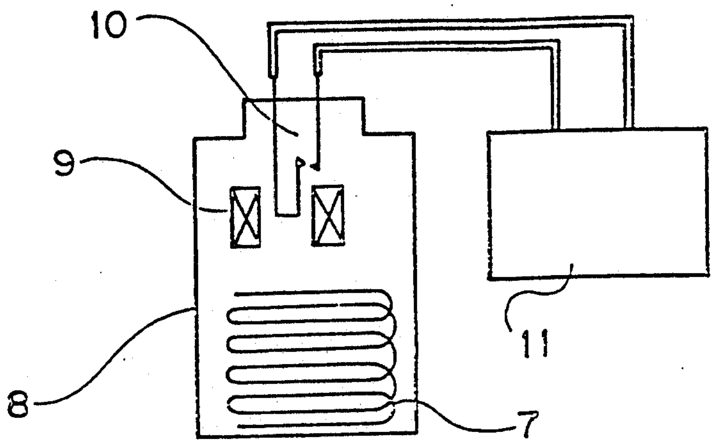
FIG. 3 is a schematic diagram of an experimental apparatus used to evaluate the performance of the magnet wires prepared in Examples 1 to 21 of the present invention.

The present inventors used an experimental apparatus of the type shown in FIG. 3 in order to investigate what effects the organic compounds evaporated from the insulation coating on a magnet wire or from the surrounding lubricant coating would have on the contact resistance of the electrical contact elements in an electromagnetic relay.

Referring to FIG. 3, a sample wire 7, is heated to evaporate a gas which fills a closed vessel 8 and which is carbonized on the surface of an electrical contact element 10 which is cyclically brought to an open or a closed position by means of coils 9. The resulting increase in the contact resistance of the contact element 10 is measured with a 4-terminal contact resistance meter 11. The effect of the sample wire 7 on the contact member can be identified by counting the number of times that the contact can be cyclically brought to open and closed positions before the measured contact resistance exceeds a certain value.

Experimental measurement with the apparatus shown in FIG. 3 was conducted in an atmosphere held at 120° C.

The present inventors conducted similar experiments for various types of lubricants and magnet wires with a polyurethane coating.

As a result of the tests described above, the present inventors found that the increase in the contact resistance of the contact element in an electromagnetic relay correlates to the vapor pressure of the lubricant and to the amounts of phenolic compounds evaporating from the insulation coating of the magnet wire. The total amount of the evaporating organic compounds is also a factor which influences the contact resistance of the contact element. The amount of evaporation is evaluated by that from the insulation coating per unit weight.

Phenolic compounds are commonly used as solvents for polyurethane enamels. They are also used as masking agents for the masked polyisocyanate, which is one of the starting materials for the manufacture of polyurethane.

Other volatile organic compounds are generated when enamel solvents other than phenolic compound and the material of which the polyurethane coating is formed are thermally decomposed by baking.

Of the volatile organic compounds mentioned above, the evaporation of phenolic compounds decreases, if the applied polyurethane coating is adequately baked.

This is also true for other enamel solvents.

However, the thermal decomposition products of the polyurethane coating increase the more the polyurethane coat is baked.

Therefore, in order to decrease both the amount of phenolic compounds that are evaporated from the insulation coating of the magnet wire and the total amount of volatile organic compounds, the degree of baking of the enamel coating applied to a magnet wire must be properly controlled.

Some commercial polyurethane enamels are of such a nature that if their coats are baked under the conditions that reduce the evaporation of phenolic compounds to below a certain level, thermal decomposition of the insulation coating already has occurred to a substantial extent and cannot be suppressed to a level below a certain value. Magnet wires which are insulated with such enamels are not suitable for use in excitation coils in an electromagnetic relay no matter what conditions are employed to bake the insulation coating.

Therefore, in order to make a magnet wire with a polyurethane based coating that is suitable for the purposes of the present invention, it is necessary not only to control the degree of baking of the insulation enamel applied to a magnet wire, but also to employ an appropriately selected insulation enamel.

A specific polyurethane based insulation enamel which was appropriately selected was applied to a conductor and subsequently baked with heat under certain conditions.

The resulting magnet wire was tested with an apparatus of the type shown in FIG. 3 in order to examine the effects of volatile gases on the contact resistance of a contact element.

It was found that if the total amount of phenolic compounds present in the organic compounds evaporated from the insulation coating is 0.2 wt % or less of the coating and if the total amount of the evaporated organic compounds is 2 wt % or less of the coating, the contact element can be cyclically brought to open and closed positions at least $5\times10^6$ times before the increase in the contact resistance of the contact element exceeds a critical value. A rating of $5\times10^6$ times that the contact element can be repeatedly brought to open and closed positions is often considered to be a minimum figure for a commercially acceptable electromagnetic relay.

More favorable conditions are attained if the total amount of phenolic compounds evaporated from the insulation coat is reduced to 0.1 wt % or less and below of the coating, and the total amount of the evaporated organic compounds is reduced to 1 wt % or less of the coating. Under such conditions, the contact element can be cyclically brought to open and closed positions at least $1\times10^7$ times before the increase in the contact resistance of the contact element exceeds a critical value. Obviously, the magnet wire of the present invention is markedly improved over the prior art product which permits the contact element to be cyclically brought to open and closed positions only about $3\times10^6$ times under the same testing conditions.

The present inventors also conducted an experiment to investigate the effect of the organic lubricant coated on the polyurethane magnet wire. To this end, various organic lubricants were compared for their effect on the increase in the contact resistance of the contact element in an electromagnetic relay employing the magnet wire in excitation coils. As a result, it was found that the vapor pressure of the organic lubricant is a significant factor in that no organic lubricant will cause adverse effects on the contact element if it has a vapor pressure of $1\times10^{-1}$ Torr or less at 200° C.

The following examples and comparative examples are provided for the purpose of further illustrating the present invention but are in no way to be taken as limiting its scope.

Unless otherwise specified, all parts, percents, ratios, and the like are by weight.

COMPARATIVE EXAMPLES 1 TO 5

Round copper wire having a conductor diameter of 50 μm were provided with 14 layers of a polyurethane insulation coating made by applying a polyurethane based insulation enamel (TPU K5-101 of Totoku Paint Co., Ltd.) which was subsequently baked under different temperature conditions. The coating speed of the magnet wire is 350 m/min.

Each of the magnet wires having different degrees of baking in the insulation coat was charged into an electric furnace held at 280° C., and the evaporating organic compounds were supplied into a gas chromatograph that was directly coupled to the electric furnace and which was equipped with a hydrogen flame ionization detector. The organic compounds were separated according to their type and their quantities were determined with an integrator. The measurements are shown in Table 1.

Each of the magnet wires was also placed in the closed vessel of an apparatus of the type shown in FIG. 3 and the time-dependent change in the contact resistance of the contact elements was measured for each magnet wire. Four contact elements were tested under the same conditions and the number of times that they could be cyclically brought to open and closed positions before the average of the contact resistance of the four contact elements reached 100 milliohms was counted. Each of the contact elements had an initial contact resistance of 20 milliohms. The resistance measurements are also shown in Table 1.

TABLE 1

| Run No. | Baking temperature (furnace temperature) (°C.) | Amount of volatile organic compounds: Phenolic compounds (%) | Amount of volatile organic compounds: Total (%) | Number of times that contact elements could by cyclically operated before contact resistance exceeded 100 mΩ ($\times10^5$) |
|---|---|---|---|---|
| Comparative Example 1 | 360 | 3.20 | 8.4 | 5 |
| Comparative Example 2 | 400 | 0.57 | 4.6 | 18 |
| Comparative Example 3 | 430 | 0.18 | 2.8 | 30 |
| Comparative Example 4 | 460 | 0.11 | 5.6 | 12 |
| Comparative Example 5 | 500 | 0.03 | 10.2 | 5 |

As Table 1 shows, none of the magnet wires tested satisfied the requirements that the total amount of phenolic compounds evaporated from the insulation coating should be no more than 0.2 wt % of the coating and that the total amount of the evaporated organic compounds should not exceed 2 wt % of the coating. In neither of the comparative examples discussed here, the contact elements could be cyclically brought to open and closed positions by at least $5\times10^6$ times, which was the desired value for a commercially acceptable electromagnetic relay.

EXAMPLES 1 TO 7 AND COMPARATIVE EXAMPLES 6 TO 8

Using a polyurethane based insulation enamel (APU-2138K of Auto Chemical Industries Co., Ltd.), magnet wires having different degrees of baking in the insulation coat were obtained in the same manner as in Comparative Examples 1 to 5.

The amounts of organic compounds evaporating from these magnet wires and the effects of such compounds on contact elements were determined in the same manner as in Comparative Examples 1 to 5. The measurements are shown in Table 2.

TABLE 2

| Run No. | Baking temperature (furnace temperature) (°C.) | Amount of volatile organic compounds: Phenolic compounds (%) | Total (%) | Number of times that contact elements could by cyclically operated before contact resistance exceeded 100 mΩ (×10^5) |
|---|---|---|---|---|
| Comparative Example 6 | 360 | 5.00 | 10.3 | 5 |
| Comparative Example 7 | 390 | 0.35 | 3.6 | 35 |
| Example 1 | 410 | 0.20 | 1.8 | 52 |
| Example 2 | 420 | 0.13 | 1.6 | 80 |
| Example 3 | 430 | 0.11 | 0.9 | >100 |
| Example 4 | 440 | 0.10 | 0.8 | >100 |
| Example 5 | 450 | 0.08 | 0.7 | >100 |
| Example 6 | 460 | 0.04 | 1.1 | >100 |
| Example 7 | 480 | 0.02 | 1.6 | 80 |
| Comparative Example 8 | 500 | 0.01 | 6.3 | 5 |

As is clear from Table 2, the contact resistances of the contact elements that were used with the magnet wires from which phenolic compounds were evaporated in a total amount exceeding 0.2 wt % of the insulation coating reached the value of 100 milliohms before the contact elements were cyclically brought to open and closed positions by $5\times10^6$ times. When the total amount of phenolic compounds evaporating from the insulation coat was no more than 0.1 wt % of the coating, the contact elements could be cyclically brought to open and closed positions by at least $1\times10^7$ times before their contact resistances reached 100 milliohms. The increase in the contact resistance of the contact elements was also promoted when the total amount of organic compounds evaporating from the insulation coating exceeded 2 wt % of the coating. A more preferred value of the total amount of organic compounds evaporating from the insulation coat is 1 wt % or less of the coating.

COMPARATIVE EXAMPLE 9

A copper conductor having a diameter of 50 μm was coated with 14 layers of a polyurethane coating made by applying a polyurethane based insulation enamel (APU-2138K of Auto Chemical Industries Co., Ltd.), which was subsequently baked at 450° C. to make a magnet wire. A coating of liquid paraffin having a vapor pressure of 0.4 Torr at 200° C. was applied to the surface of the magnet wire. Thereafter, a certain amount of the wire was sampled and washed with n-hexane to extract the liquid paraffin. Calculation of the paraffin deposit on the magnet wire was made on the basis of the measurement of the amount of extracted liquid paraffin and this showed that the wire had a paraffin coating in a thickness of 0.06 μm.

The magnet wire with a liquid paraffin coating was placed in the closed vessel of an apparatus of the type shown in FIG. 3 and the time-dependent change in the contact resistance of the contact element was measured. Four contact elements were tested under the same conditions and the number of times that they could be cyclically brought to open and closed positions before the average of contact resistance of the four contact elements reached 100 milliohms was counted. Each of the contact elements had an initial contact resistance of 20 milliohms. The resistance measurements are shown in Table 3.

COMPARATIVE EXAMPLE 10

A magnet wire prepared as in Comparative Example 9 was coated with a layer of spindle oil having a vapor pressure of 3 Torr at 200° C. The thickness of the spindle oil coat was measured in the same manner as in Comparative Example 9 and found to be 0.05 μm.

The effects of the magnet wire on contact elements were investigated in the same manner as in Comparative Example 9 and the results are shown in Table 3.

COMPARATIVE EXAMPLE 11

A magnet wire prepared as in Comparative Example 9 was coated with an n-hexane solution of solid paraffin (vapor pressure at 200° C.: 0.4 Torr) and the coating was subsequently dried. The thickness of the paraffin coating was found to be 0.03 μm on a dry basis. The effects of the magnet wire on contact elements were investigated in the same manner as in Comparative Example 9 and the results are shown in Table 3.

EXAMPLE 8

Polyethylene having an average molecular weight of 2,000 and a vapor pressure of 0.1 Torr or less at 200° C. was dissolved in xylene with heat. The resulting solution was applied to the surface of the magnet wire, which was obtained as in Comparative Example 9. After drying, the polyethylene coating was found to have a thickness of 0.1 μm. The effects of the magnet wire on contact elements were investigated in the same manner as in Comparative Example 9 and the results are shown in Table 3.

EXAMPLE 9

Polyethylene having an average molecular weight of 3,000 and a vapor pressure of 0.1 Torr or less at 200° C. was dissolved in aromatic naphtha with heat. The resulting solution was applied to the surface of the magnet wire which was obtained as in Comparative Example 9. After drying, the polyethylene coating was found to have a thickness of 0.1 μm. The effects of the magnet wire on contact elements were investigated in the same manner as in Comparative Example 9 and the results are shown in Table 3.

EXAMPLE 10

Polypropylene having an average molecular weight of 3,000 and a vapor pressure of 0.1 Torr or less at 200° C. was dissolved in xylene with heat. The resulting solution was applied to the surface of the magnet wire which was obtained as in Comparative Example 9. After drying, the polypropylene coating was found to have a thickness of 0.1 μm. The effects of the magnet wire on contact elements were investigated in the same manner as in Comparative Example 9 and the results are shown in Table 3.

EXAMPLE 11

Polymethylpentene having an average molecular weight of 10,000 and a vapor pressure of 0.1 Torr or less at 200° C. was dissolved in cyclohexane with heat. The resulting solution was applied to the surface of the magnet wire which was obtained as in Comparative Example 9. After drying, the polymethylpentene coating was found to have a thickness of 0.1 μm. The effects of the magnet wire on contact elements were investigated in the same manner as in Comparative Example 9 and the results are shown in Table 3.

EXAMPLE 12

Polyethylene (average molecular weight: 2,000) of the same type as used in Example 8, a xylene-soluble polyvinyl butyral resin, and MS-50 (trade name of Nippon Polyurethane Industry Co., Ltd. for a masked polyisocyanate) were mixed at a weight ratio of 10/50/40 and the mixture was dissolved in xylene with heat. The resulting solution was applied to the surface of the magnet wire which was obtained as in Comparative Example 9. After baking, the three-component coating on the magnet wire was found to have a thickness of 0.1 μm. The effects of the magnet wire on contact elements were investigated in the same manner as in Comparative Example 9 and the results are shown in Table 3.

EXAMPLE 13

Polyethylene (average molecular weight: 3,000) of the same type as used in Example 9 and polyurethane based insulation enamel (APU-2138K of Auto Chemical Industries Co., Ltd.) were mixed at a weight ratio of 20/80 on a solids (resin) basis and dissolved in a 5/5 mixture of cresol and aromatic naphtha (boiling in the range of 145° to 155° C.) by heating. The resulting solution was applied to the surface of the magnet wire, which was obtained as in Comparative Example 9. After baking, the two-component coating on the magnet wire was found to have a thickness of 0.1 μm. The effects of the magnet wire on contact elements were investigated in the same manner as in Comparative Example 9 and the results are shown in Table 3.

EXAMPLE 14

Polyethylene (average molecular weight: 3,000) of the same type as used in Example 9, Epikote #1009 (trade name of Shell International Chemicals Corp. for an epoxy resin), and MS-50 (trade name of Nippon Polyurethane Industry Co., Ltd. for a masked polyisocyanate) were mixed at a weight ratio of 1/53/46 and dissolved in a 4/6 mixture of cresol and aromatic naphtha by heating. The resulting solution was applied to the surface of a magnet wire, which was obtained in the same manner as in Comparative Example 9. After baking, the three-component coating on the magnet wire was found to have a thickness of 0.1 μm. The effects of the magnet wire on contact elements were investigated in the same manner as in Comparative Example 9 and the results are shown in Table 3.

EXAMPLES 15 TO 21

The same procedures as in Example 14 were repeated except that the weight ratio of polyethylene (average molecular weight: 3,000) of the same type as used in Example 9, Epikote #1009 and MS-50 was changed to 10/48/42, 20/42/38, 30/37/33, 40/32/28, 50/27/23, 70/16/14 and 90/5/5, and were subsequently dissolved in a 4/6 mixture of cresol and aromatic naphtha by heating. The resulting solutions were applied to the surface of the magnet wires which were obtained as in Comparative Example 9. After baking, the three-component coating on each of the magnet wires were found to have a thickness of 0.1 μm. The effects of the magnet wire on contact elements were investigated in the same manner as in Comparative Example 9 and the results are shown in Table 3.

TABLE 3

| Run No. | Lubricating organic compound in outermost layer | Average molecular weight | Vapor pressure at 200° C. (Torr) | Number of times that contact elements could by cyclically operated before contact resistance exceeded 100 mΩ (×10⁵) |
|---|---|---|---|---|
| Comparative Example 9 | liquid paraffin | — | 0.4 | 20 |
| Comparative Example 10 | spindle oil | — | 3 | 5 |
| Comparative Example 11 | solid paraffin | — | 0.4 | 17 |
| Example 8 | polyethylene | 2,000 | <0.1 | >100 |
| Example 9 | polyethylene | 3,000 | <0.1 | >100 |
| Example 10 | polypropylene | 3,000 | <0.1 | >100 |
| Example 11 | polymethylpentene | 10,000 | <0.1 | >100 |
| Example 12 | polyethylene, PVB, MS-50 | 2,000 | <0.1 | >100 |
| Example 13 | polyethylene, urethane enamel | 3,000 | <0.1 | >100 |
| Example 14 | polyethylene, Epikote, MS-50 | 3,000 | <0.1 | >100 |
| Example 15 | polyethylene, Epikote, MS-50 | 3,000 | <0.1 | >100 |
| Example 16 | polyethylene, Epikote, MS-50 | 3,000 | <0.1 | >100 |
| Example 17 | polyethylene, Epikote, MS-50 | 3,000 | <0.1 | >100 |
| Example 18 | polyethylene, Epikote, MS-50 | 3,000 | <0.1 | >100 |
| Example 19 | polyethylene, Epikote, MS-50 | 3,000 | <0.1 | >100 |
| Example 20 | polyethylene, | 3,000 | <0.1 | >100 |

TABLE 3-continued

| Run No. | Lubricating organic compound in outermost layer | Average molecular weight | Vapor pressure at 200° C. (Torr) | Number of times that contact elements could by cyclically operated before contact resistance exceeded 100 mΩ ($\times 10^5$) |
|---|---|---|---|---|
| Example 21 | Epikote, MS-50 polyethylene, Epikote, MS-50 | 3,000 | <0.1 | >100 |

Note: In Examples 14 to 21, the ratio of polyethylene, Epikote, and MS-50 was varied.

As is clear from the results shown in Table 3 above, the polyurethane magnet wire according to the present invention, i.e., that having an organic lubricant coating having a vapor pressure of $1\times10^{-1}$ Torr or less at 200° C. has excellent properties as a magnet wire for an electromagnetic relay.

While the invention has been described in detail and with reference to specific examples thereof, it will be apparent to one skilled in the art that various changes and modifications can be made therein without departing from the spirit and scope thereof.

What is claimed is:

1. A polyurethane magnet wire comprising a conductor having provided thereon a polyurethane insulation coating, wherein the total amount of the phenolic compounds contained in organic compounds which evaporate from said coating by heating at 280° C. for 2 minutes is 0.2 wt % or less based on the weight of said coating, and the total amount of said organic compounds which evaporate from said coating is 2 wt % or less based on the weight of said coating.

2. A polyurethane magnet wire as claimed in claim 1, wherein the total amount of said phenolic compounds is 0.1 wt % or less based on the weight of said coating.

3. A polyurethane magnet wire as claimed in claim 1, wherein the total amount of said organic compounds is 1 wt % or less based on the weight of said coating.

4. A polyurethane magnet wire as claimed in claim 1, wherein the total amount of said phenolic compounds is 0.1 wt % or less based on the weight of said coating and the total amount of said organic compounds is 1 wt % or less based on the weight of said coating.

5. A polyurethane magnet wire comprising a conductor having provided thereon a polyurethane insulation coating, wherein the total amount of the phenolic compounds contained in organic compounds which evaporate from said coating by heating at 280° C. for 2 minutes is 0.2 wt % or less based on the weight of said coating, and the total amount of said organic compounds is 2 wt % or less based on the weight of said coating, and having provided on said polyurethane insulation coating a coating of an organic lubricant having a vapor pressure of $1\times10^{-1}$ Torr or less at 200° C.

6. A polyurethane magnet wire as claimed in claim 5, wherein the total amount of said phenolic compounds is 0.1 wt % or less based on the weight of said coating.

7. A polyurethane magnet wire as claimed in claim 5, wherein the total amount of said organic compounds is 1 wt % or less based on the weight of said coating.

8. A polyurethane magnet wire as claimed in claim 5, wherein the total amount of said phenolic compounds is 0.1 wt % or less based on the weight of said coating and the total amount of the said organic compounds is 1 wt % or less based on the weight of said coating.

9. A polyurethane magnet wire as claimed in claim 5, wherein said organic lubricant is a polyolefinic hydrocarbon.

10. A polyurethane magnet wire as claimed in claim 9, wherein said polyolefinic hydrocarbon is polyethylene, polypropylene, or polymethylpentene.

11. A polyurethane magnet wire as claimed in claim 5, wherein the coating of an organic lubricant is formed by applying and baking an enamel comprising (a) polyethylene, (b) a binder for preventing the separation of a polyethylene coat, and (c) a solvent.

12. A polyurethane magnet wire as claimed in claim 11, wherein the weight ratio of said polyethylene (a) to said binder (b) is in the range of from 1/99 to 90/10.

13. A polyurethane magnet wire as claimed in claim 11, wherein the weight ratio of said polyethylene (a) to said binder (b) is in the range of from 10/90 to 50/50.

14. A polyurethane magnet wire as claimed in claim 11, wherein said polyethylene (a) has an average molecular weight of 5,000 or less.

15. A polyurethane magnet wire as claimed in claim 11, wherein said polyethylene (a) has an average molecular weight of 500 or more.

16. A polyurethane magnet wire as claimed in claim 11, wherein said binder (b) is a resin.

17. A polyurethane magnet wire as claimed in claim 11, wherein said binder (b) is a thermoplastic resin.

18. A polyurethane magnet wire as claimed in claim 11, wherein said binder (b) is a thermosetting resin.

19. A polyurethane magnet wire as claimed in claim 11, wherein said binder (b) is a resin that is useful as an insulation enamel of magnet wire.

* * * * *